March 18, 1930.  W. KONING  1,751,410
ANCHOR INSERTING MACHINE
Filed May 20, 1926  5 Sheets-Sheet 1

Inventor
Willem Koning,
by
His Attorney.

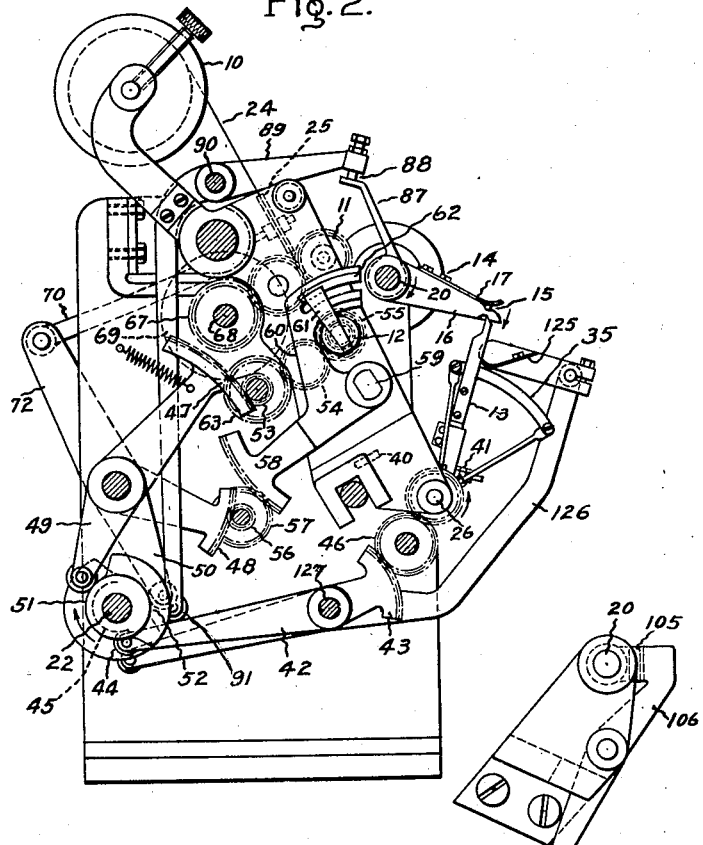
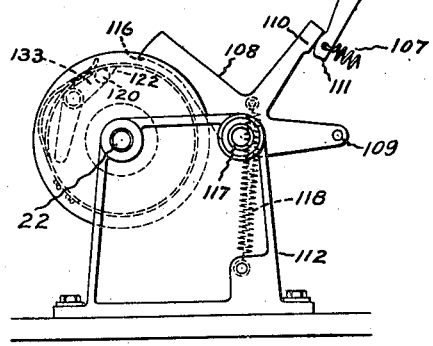

March 18, 1930.  W. KONING  1,751,410
ANCHOR INSERTING MACHINE
Filed May 20, 1926  5 Sheets-Sheet 3
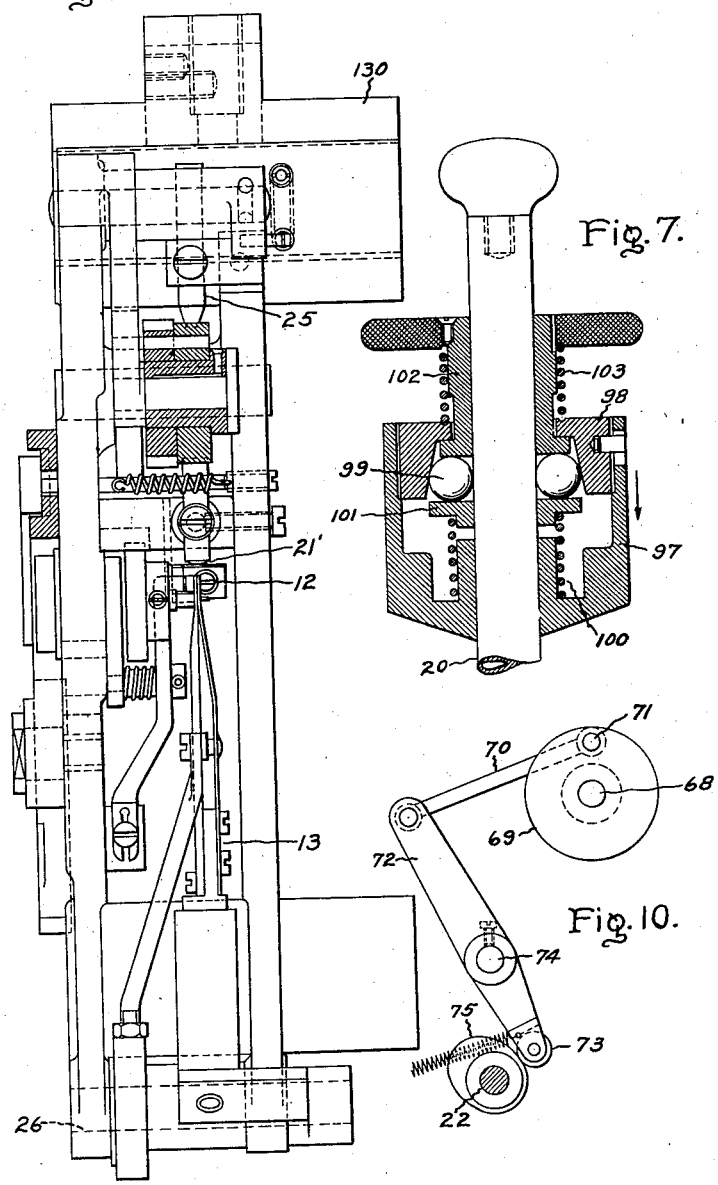
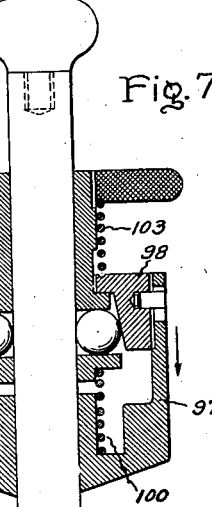
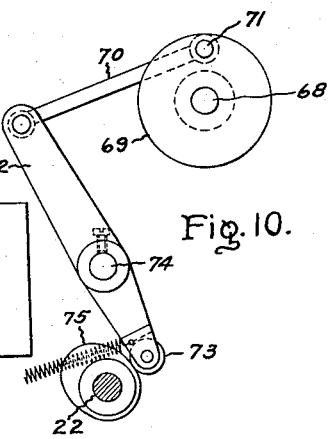
Inventor
Willem Koning,
by *Alexander S. Lunt*
His Attorney.

March 18, 1930.  W. KONING  1,751,410
ANCHOR INSERTING MACHINE
Filed May 20, 1926  5 Sheets-Sheet 4
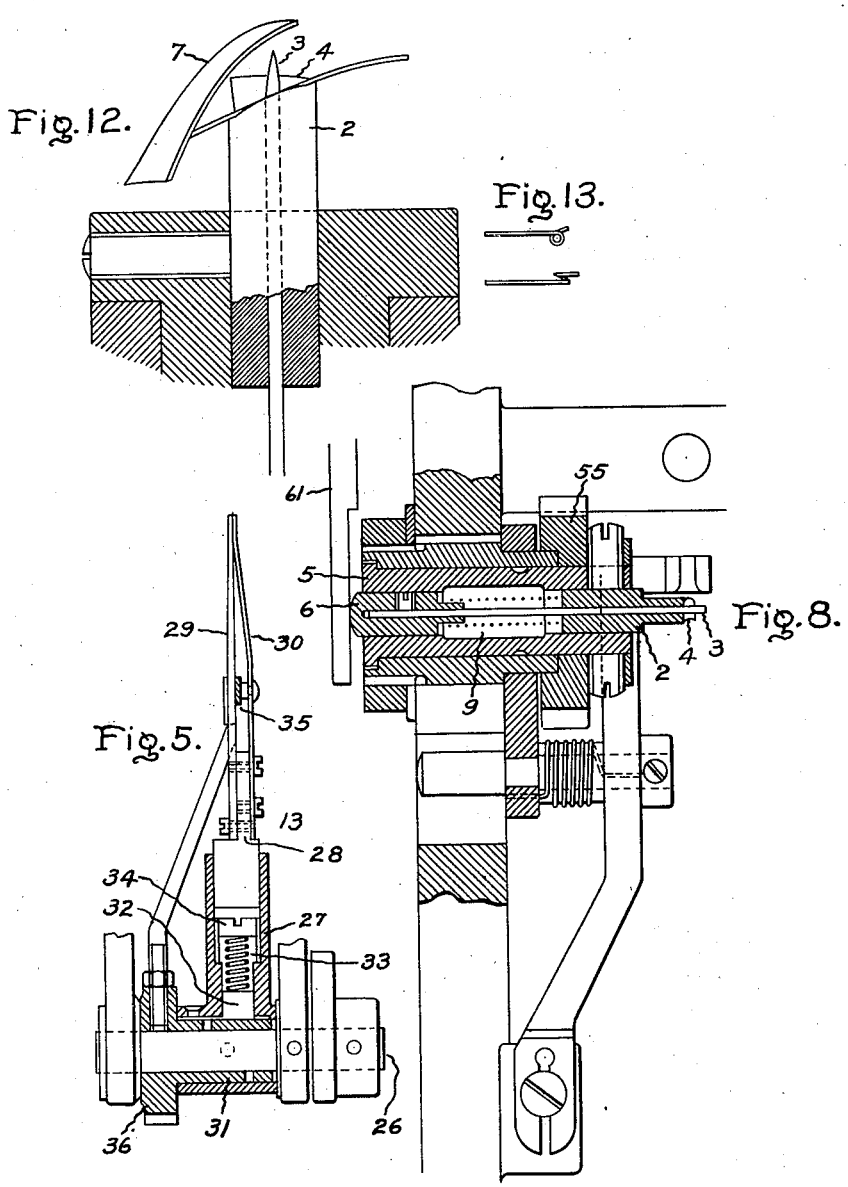
Inventor
Willem Koning,
by
His Attorney.

March 18, 1930.  W. KONING  1,751,410
ANCHOR INSERTING MACHINE
Filed May 20, 1926   5 Sheets-Sheet 5

Inventor
Willem Koning,
by
His Attorney.

Patented Mar. 18, 1930

1,751,410

UNITED STATES PATENT OFFICE

WILLEM KONING, OF EINDHOVEN, NETHERLANDS, ASSIGNOR TO GENERAL ELECTRIC COMPANY, A CORPORATION OF NEW YORK

ANCHOR-INSERTING MACHINE

Application filed May 20, 1926, Serial No. 110,577, and in the Netherlands June 25, 1925.

This invention relates to a machine for inserting filament anchors in a glass rod, particularly a machine provided with a mechanism for making the anchors and a device for picking up these anchors and carrying them from this mechanism to the place of insertion. The mechanisms and devices are placed radially, with reference to a central inserting place, and the anchors are inserted radially into a glass rod.

One object of the invention is to provide a machine which will insert the anchors in parallel in a glass rod by which it will be possible to make, among other things, glass rods suitable for supporting straight filaments such as those used in "Linolite" lamps.

To this end the newly made anchors are inserted in parallel, or nearly in parallel, in the glass rod by installing side by side, or nearly so, a number of anchor-making mechanisms and inserting devices two and two together. An anchor making mechanism and an anchor pick-up device may be installed together as a unit, and these units may then be mounted to be adjustably spaced. As one object is to adjust the spacing between the anchors, it is advisable to combine the anchor-making mechanisms and pick-up devices into units, and to mount these units to secure an adjustable spacing between them. The anchors will preferably be held perpendicular to the glass rod and pressed into a previously heated part of the rod. Gas burners may be provided for this purpose to heat the rod locally. The rod may be moved in such a way that the hot glass covers the ends of the anchors held perpendicular to the glass rod. In case the anchors are close together in the glass rod, it is not possible to insert all of them simultaneously, unless a separate unit is provided for each of them, which makes the machine very compact. In order to obtain the desired result a part of the anchors, for example, two, are inserted in the glass rod simultaneously and the latter is then moved a certain distance lengthwise. To this end a device is provided, according to the invention, to move the glass rod lengthwise a fixed but adjustable distance periodically. For example, movable holders for the rod are mounted to allow a movement of the rod in two perpendicular directions. For this purpose a shaft is provided, to which some arms are rigidly connected, and the holders for the rod are mounted on these arms, while the shaft is periodically moved longitudinally a fixed, but adjustable distance.

One example of an embodiment of the invention will be explained in detail by referring to the attached drawings, in which:

Fig. 2 is a cross-section along the line 11—11 in Fig. 1;

Fig. 3 is a plan view of a unit which contains a mechanism for making anchors and a device for picking up anchors;

Fig. 4 is a view of a mechanism for stopping the machine automatically as soon as the rod has been provided with the required number of anchors;

Fig. 5 is a view on a larger scale of the device for picking up anchors;

Fig. 7 is a view on a larger scale of a movable arm, which carries along a shaft in one direction of rotation, while this shaft will not be carried along in the opposite direction of rotation;

Fig. 8 is a view on a larger scale of the mechanism for shaping the eye of the anchor;

Fig. 10 is a view on a larger scale of the drive of the wire feed mechanism.

Fig. 12 is a view on a larger scale of a portion of the mechanism for shaping the eye of the anchor; and Fig. 13 is a completed anchor.

Figure 1:
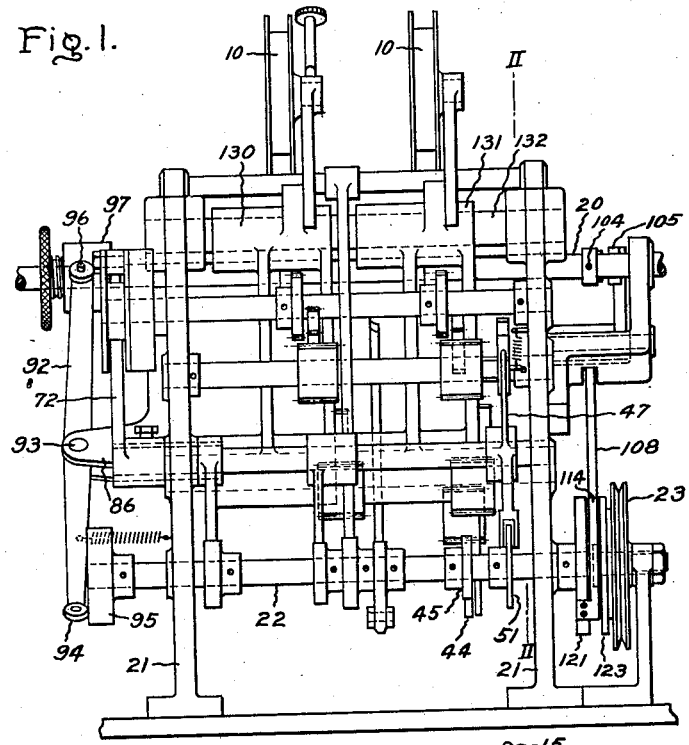
Fig. 1 is a front view of a machine suitable for the manufacture of filament supports for straight filament lamps often referred to as "Linolite" lamps.

Before describing the mechanism in detail the mode of operation of the machine will be described.

The anchors are shaped by means of a mechanism which contains an anchor wire spool 10 (Figs. 1 and 2), wire feed rolls 11 and an eye-shaping mechanism (Fig. 3). The newly made anchor is picked up from the shaping mechanism by the pick-up jaws 13, and is carried by these jaws to a position where it is perpendicular to a glass rod 15 in a holder 14, which comprises a rigid arm 16 and a rod holding finger 17. The rigid arm 16 is keyed to a shaft 20, which is not only rotatable, but is also movable longitudinally.

Fig. 1 shows an installation with two anchor-making mechanisms side by side. In conjunction with these two mechanisms, two pick-up devices for the anchors are shown for placing two anchors simultaneously in a definite position with reference to the glass rod 15. Further, two burners are installed in such a way that the glass is heated locally and that the positioned anchors may easily be pressed into these heated spots. These spots are selected so that they will be located exactly in registry or in line with the positioned anchors held perpendicular to the glass rod. When the shaft 20 rotates, the glass rod is moved sidewise into contact with the positioned anchors, which as a result are inserted in the heated spots of the rod 15, after which the pick-up jaws 13 release the inserted anchors and return to position 12, where other anchors are being made. An additional movement may now be given to the shaft 20 in the direction of its own length, and thus the shaft may be moved so that two new spots on the rod are heated by the burners during the subsequent lining-up of the next two anchors and are thus prepared to receive the latter.

The spacing between the two mechanisms has been made adjustable. For this reason the shaping mechanisms and pick-up devices have been united two and two together into units, the two units being carried on blocks 130 and 131 with left and right-hand threads respectively. A shaft 132 is rotatable in these blocks and the spacing between the two units can be adjusted by rotation or angular displacement of this shaft.

The mechanism of the machine will now be briefly explained with reference to the drawings. A frame 21 carries several shafts for operating the mechanisms, one of these shafts 22 being a cam-shaft, which actuates the various parts and which is driven by a pulley 23 from a source of power, not shown. Two identical anchor-shaping and pick-up mechanisms are shown but only one will be described, and is shown on a larger scale in Figures 2 and 3. The anchor wire 24 supplied from the spool 10 is conducted through a guide 25 and is pushed forward a certain distance by the feed rolls 11. Farther on the wire is guided in such a way that the projecting end of the wire slides between a pin 3 and a cam 4 on the end of the tubular shaft 2, as shown on a larger scale in Figures 8 and 12. During its movement the wire encounters an inclined surface 7, and when the shaft 2 rotates, the wire is wound around the pin 3 at a slight angle, an "eye" being formed in the end of the wire as shown in Figure 13. Subsequently, an anchor with this eye is cut off from the wire 24 by a cutting-off mechanism $21^1$ (Fig. 3). The anchor made in this way will be caught by the pick-up jaws 13, which are rotatable upon a pivot 26, and comprises a rigid arm 29 and a cooperating elastic arm 30, both mounted on an extension 28 of the socket 27, which rotates upon the bushing 31. The socket 27 and the pick-up jaws rotate with the bushing 31 by friction. To this end a small block 32 is mounted in a recess in the socket 27, and is pressed against the bushing 31 by a spring 33 and a screw 34. A wedge 35 fastened to this bushing can slide in the position shown in Figure 2, between the two arms 29 and 30 until the jaws 13 are open. The wedge 35 and the jaws 13 will move together when the shaft 26 rotates in the direction of the arrow, shown in Figure 2. The socket 27 is carried along by the bushing 31 by the friction between the small block 32 and the bushing 31, so that there will be no change in the relative position of the wedge and the arms 29 and 30. Continued rotation of the shaft 26 causes the arms 29 and 30 to strike a stop 40, which prevents further movement of the socket 27, at the moment when the shaping mechanism 12 has completed an "eye in the end of an anchor". This anchor is exactly between the open arms 29 and 30. A continued rotation of the shaft 26 carries along the wedge 35, removing the thicker part of it from between the arms 29 and 30, and permitting these arms and the pick-up jaws 13 to close upon the anchor. The anchor is thus caught and is afterwards cut off, while the shaft 26 moves backwards in a direction opposite to the arrow shown in Fig. 2, both the socket 27 and the wedge 35 moving together and their relative position being unchanged. Thus the arms 29 and 30 remain closed during the continued backward rotation of the shaft 26, but eventually the socket 27 strikes a stop 41 and is held in such a position that the anchor in the pick-up jaws will be positioned exactly in register with the heated spots of the glass rod 15. At this instant the shaft 26 stops its rotation for an instant and the holder 14 for the rod 15 moves in such a way that the glass rod is moved bodily sidewise and its heated part is pressed down over the ends of the positioned anchors. Next, the shaft 26 resumes its backward rotation in the direction opposite to the arrow in Figure 2 and therefore the wedge 35 is carried along and separates the arms 29 and 30, opening the pick-up jaws 13. The anchor thus released, has in the meantime been embedded in the glass rod.

The various movements of the shaft 26 are controlled by a rocker arm 42, equipped on one end with a gear sector 43, which meshes with a pinion 46, and on the other end with a roller 44 which rides on a cam 45 mounted on the shaft 22. The movements of the eye-shaping mechanism are controlled by similar gear sectors 47 and 48, which in turn form part of the rocker arms 49 and 50 respectively. These rocker arms 49 and 50 are equipped with rollers which ride on the cams 51 and 52. The gear sector 47 causes the pinion 53 to have an oscillating movement which is transmitted to a gear 55 (Figs. 2 and 8) by gears 63 and 54. This gear 55 causes the sleeve 5 to move, which in turn causes a reciprocating movement of the cam 4. As described previously the purpose of this cam is to assist in the shaping of the end of the anchor wire into an "eye" around the pin 3. This pin 3 may reciprocate freely inside the sleeve 2 and the cam 4, and further is clamped in a tappet 6, which rests with one end against a lever 61. The tappet 6 is pressed by a spring 9 outward as far as possible from the cam 4 when the lever 61 does not exert any pressure on it. In this way the pin 3 is withdrawn, and the newly shaped anchor may now be removed. On the other hand, when the lever 61 presses against the tappet 6, the pin 3 projects and the wire, pushed between the pin and the cam, 4, is bent around the pin into the form of an "eye" during the rotation of the cam 4.

The lever 61 is actuated by the gear sector 58 (Fig. 2) driven from the gear sector 48 by pinions 56 and 57, which impart to the arm 60 an oscillating motion. Guides 62 on the arm 60 cause the lever 61 to move back and forth.

Figure 6:
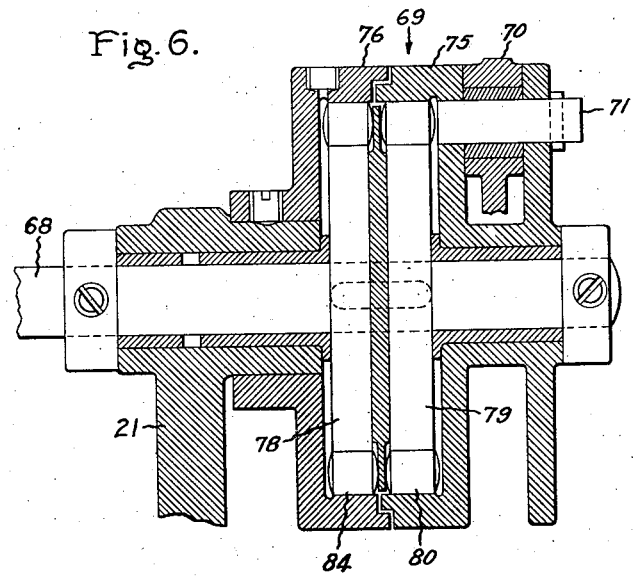
Fig. 6 is a cross-section of a roller clutch.
Figure 9:
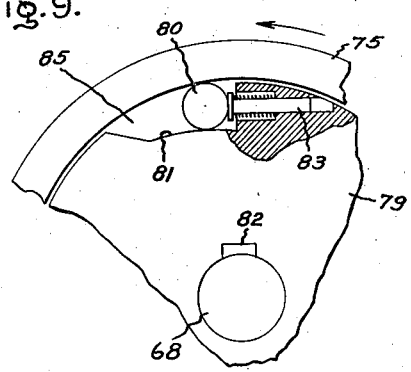
Fig. 9 is a side view partly in section of the roller clutch.

The wire is pushed forward a fixed distance periodically by the feed rolls 11. These rolls are driven from the shaft 68 by means of a pinion 67. The roller clutch 69 insures that the shaft 68 moves in one direction only. This roller clutch is driven through a rod 70 and a rocker arm 72 (Figs. 2 and 10) pivoted on the shaft 74. The rocker arm 72 has a roller 73 which rides on the cam 75 on to the shaft 22, and gives the rocker-arm 72 back and forth movement which is transmitted by the rod 70 to the pin 71 of the clutch 69. This clutch comprises two discs 78 and 79 (Fig. 6) keyed to the shaft 68, a ring 76 which is rigidly attached to the frame 21, and a ring 75, which may oscillate freely. The freely oscillating ring 75 is connected through the pin 71, to an arm 70 which moves back and forth and oscillates the ring 75. The rim of the disc 79 has been provided with a number of recesses for rollers 80 (Figs. 6 and 9). When the ring 75 rotates in the direction of the arrow in Fig. 9, the roller 80 is pressed against the eccentric part 81 of the disc 79, which then carries the ring 75 along. To prevent slip, the rollers 80 are pressed against the inclined bottoms 81 of the recesses by spring operated buffers 83.

The rollers 80 do not carry the disc 79 along, when the ring 75 rotates in a direction opposite the arrow. To prevent the discs rotating backwards, a second disc 78 has been provided, constructed analogous to the disc 79. In case the disc 78 rotates in a direction opposite to the arrow in Fig. 9, the rollers 84 will lock the recesses of the disc 78, which will thereby be prevented from rotating because the ring 76 is fastened rigidly to the frame 21, so that rotation of the shaft 68 in a direction opposite to that of the arrow in Fig. 9 is prevented. By this arrangement the shaft 68 is turned forward a definite angle periodically, so that the anchor wire will be fed forward a fixed length by means of the pinion 67 and the feed rolls 11.

A description has now been given of the process of shaping the anchors and the pick-up device which picks up these anchors and positions them in a certain relation to the glass rod 15. Now the movement of the holders for the glass rod will be explained in detail.

Figure 11:
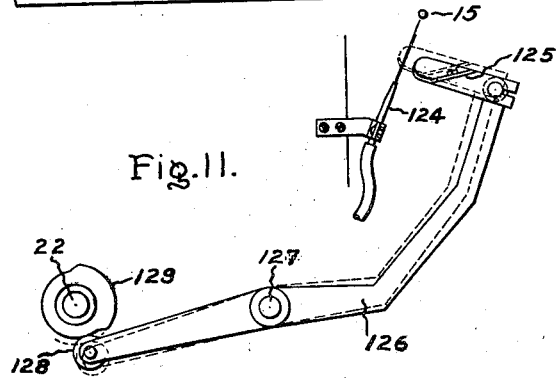
Fig. 11 is a view on a larger scale of the devices for protecting the glass rod against excessive heating by the burners.

The glass rod 15 is held in a holder 14 comprising an arm 16 rigidly fastened to the shaft 20, and a flexible finger 17, attached to the arm. At the moment the anchors are positioned under the rod 15, it is heated by burners 124 (Fig. 11) installed especially for this purpose, and afterwards the heated spots of the rod are pressed over the ends of the positioned anchors. The mechanism for doing this comprises a lever 87 fastened to the shaft 20 and resting against a set screw 88 on one end of a bell-crank rocker-arm 89 mounted to oscillate on a pivot 90 and having a roller on its other end to follow a cam on the shaft 22. When the set screw moves upwards the shaft 20 is free to revolve and the arm 16 with the glass rod 15 carried by it will move clockwise as indicated in Fig. 2 with the result that the heated parts of the rod are pressed over the ends of the positioned anchors. As soon as the anchors have been embedded in the glass rod the pick-up jaws 13 return to the anchor making mechanism. In the meantime the shaft 20 will have been moved longitudinally a distance corresponding to the spacing between two adjacent anchors in the glass rod. For moving the shaft 20 longitudinally use is made of a shaft shifter comprising a collar 97 (Figs. 1 and 7) mounted on the shaft 20, and engaged by the forked end 96 of a lever 92 pivoted in a pedestal 86 on the frame 21, the other end having a roller 94 which rides on a face cam 95. In this way the lever 92 oscillates and moves the collar 97 back and forth along the shaft 20. In order that the shaft 20 may be carried along in one direction only, the collar 97 is provided with a ratchet clutch comprising a cup 98 (Fig. 7) with a conical recess in which balls 99 are seated by a spring 100 pressing on a ball retaining ring 101. When the collar moves in the direction of the arrow shown in Fig. 7 the balls 99 will be pressed by the conical walls of the cup 98 against the shaft 20, gripping it and carrying the shaft along with the cup 97. The tension of the spring 100 is slight so that the balls may move away from the conical walls of the cup 98 and release the shaft 20 when the collar moves in a direction opposite the arrow. As a result of this construction the shaft 20 and therefore also the glass rod held in the holders 14 will be pushed forward a certain distance periodically. In order to be able to move the shaft 20 independently of the collar 97, a bushing 102 is provided and is held against the bottom of the cup 98 by a spring 103. If pressure is exerted to overcome the spring 103 the bushing 102 will push the balls 99 out of the cup 98 and release the shaft 20.

After a sufficient number of anchors have been inserted in the glass rod the machine should be stopped automatically. For this purpose a collar 104 is fastened to the shaft 20, and after the shaft 20 has been moved lengthwise a predetermined distance this collor 104 will move a stop 105, thereby rotating the rocker-arm 106, which is held in a normal position by a spring 107 and also rests with one end 111 against the arm 110 of a pawl 108 pivoted on a pin 117 in the pedestal 112, and having on one end a catch 116, which in a certain position uncouples a driving clutch comprising discs 121 and 123. The discs 121 carries a lever 133 with a pin 120 for catching notches 122 in the disc 123. When the collar 104 engages the stop 105 the catch 116 will be pressed into the annular groove 114 of the disc 123 (Figs. 1 and 4) owing to the rotation of the rocker-arm 106 with the result that the pin 120 is lifted from the notches 122, and the disc 121 is no longer driven by the disc 123 connected to the driving pulley whereupon the cam shaft 22 comes to rest and all movements of the mechanisms stop.

As already stated the glass rod 15 is heated locally by the burners 124 and it is very desirable that the flame of the burner does not remain pointed too long at the same part of the rod. To accomplish this, movable asbestos plates 125 (Fig. 11) have been mounted on a lever 126, pivoted on a pivot 127 and moved by a cam roller 128 on the end which rides on cam 129 on the cam shaft 22. In this way the rocker-arm 126 will oscillate to place the asbestos plates 125 periodically between the burners 124 and the glass rod 15.

What I claim as new and desire to secure by Letters Patent of the United States, is:—

1. An anchor inserting machine comprising a holder for a glass rod mounted to move in two planes perpendicular to each other, an anchor inserting mechanism mounted adjacent said holder for positioning an anchor with the straight end in juxtaposition to a rod in said holder, a heater for softening a spot on said rod in the path of the anchor in said transfer device, and common driving means for actuating said mechanism and for automatically and alternately oscillating said holder in one plane and moving it bodily in the other plane.

2. An anchor inserting machine comprising a rotatable and longitudinally movable shaft having an arm, a holder on said arm for a glass rod, an anchor inserting mechanism for positioning a hooked anchor with its straight end in the path described by a rod in said holder when said shaft rotates, a burner for softening said rod at a spot in registery with the positioned anchor, and common driving means for actuating said mechanism and for alternately oscillating said shaft and moving it a predetermined distance longitudinally.

3. In an anchor inserting machine, the combination of a holder for a glass rod, a heater for softening a portion of said rod, a plurality of anchor inserting units mounted side by side in a straight line parallel to said rod and to be adjustable to vary the distance between them and each comprising an anchor making mechanism and an anchor transfer mechanism for removing an anchor to inserting position with its straight end adjoining and perpendicular to said glass rod, and common actuating means for actuating all said units and producing relative movement of said holder and said units to move the rod in said holder sidewise and simultaneously insert in the heated portion of said rod and side by side the anchors in said units.

4. In a machine for inserting a row of anchors extending longitudinally of a glass rod, the combination of an anchor mechanism for making an anchor having one end bent into a hook and carrying it into inserting position with its straight end at a predetermined place, a rod holder comprising a longitudinally movable rock shaft mounted perpendicular to the positioned anchor in said mechanism with a rod holding arm projecting from said shaft to hold a glass rod parallel to said shaft, a burner for softening on the rod in said holder a spot in registry with the positioned anchor, driving means for said mechanism, and rod actuating means for said shaft driven from said driving means to rock said shaft to carry said arm toward and away from the positioned anchor.

5. In a machine for inserting a row of anchors extending longitudinally of a glass rod, the combination of an anchor mechanism for making an anchor having one end bent into a hook and carrying it into inserting position with its straight end at a predetermined place, a rod holder comprising a longitudinally movable rock shaft mounted perpendicular to the anchor held in said mechanism with a rod holding arm projecting from said shaft to hold a glass rod parallel to said shaft, a shaft shifter for intermittently moving said shaft endwise, driving means for said mechanism, and rod actuating means for said shaft driven from said driving means to rock said shaft to carry said arm toward and away from the positioned anchor and to actuate said shaft shifter.

6. In a machine for inserting a row of anchors extending longitudinally of a glass rod, the combination of an anchor making mechanism for making an anchor having one end bent into a hook, a transfer mechanism for picking up an anchor out of said anchor making mechanism and carrying it into inserting position with its straight end at a predetermined place, a rod holder comprising a longitudinally movable rock shaft mounted perpendicular to the anchor held in said transfer mechanism with a rod holding arms projecting from said shaft to hold a glass rod parallel to said shaft, an oscillating lever, a one way clutch mounted on said arm to engage said shaft and move it longitudinally step by step, driving means for said mechanisms, and rod actuating means for said shaft driven from said driving means for alternately rocking said shaft to carry said arm towards and away from the positioned anchors and oscillating said lever to shift said shaft lengthwise.

7. In a machine for inserting a row of anchors extending longitudinally of a glass rod, the combination of unitary devices mounted side by side on a line and each comprising an anchor making mechanism for making an anchor having one end bent into a hook, and a transfer mechanism for picking up an anchor out of said anchor making mechanism and carrying it into inserting position with its straight end at a predetermined place, means for varying at will the spacing of said devices, a rod holder comprising a longitudinally movable rock shaft mounted perpendicular to the anchors held in said transfer mechanisms and having rod holding arms projecting from said shaft to hold a glass rod parallel to said shaft, burners for softening on the rod in said holder spots in registry with said positioned anchors, driving means for said mechanisms, and rod actuating means for said shaft driven from said driving means to rock said shaft to carry said arms toward and away from the positioned anchors.

In witness whereof, I have hereunto set my hand this 27th day of April, 1926.

WILLEM KONING.